US011294317B2

(12) United States Patent
Miyakawa et al.

(10) Patent No.: US 11,294,317 B2
(45) Date of Patent: Apr. 5, 2022

(54) IMAGE FORMING APPARATUS HAVING STOPPER PREVENTING UNINTENTIONAL OPENING OF MAIN BODY

(71) Applicant: CANON KABUSHIKI KAISHA, Tokyo (JP)

(72) Inventors: Shogo Miyakawa, Yokohama (JP); Masaaki Takeuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/124,939

(22) Filed: Sep. 7, 2018

(65) Prior Publication Data

US 2019/0004467 A1   Jan. 3, 2019

Related U.S. Application Data

(63) Continuation of application No. PCT/JP2017/008759, filed on Mar. 6, 2017.

(30) Foreign Application Priority Data

Mar. 9, 2016  (JP) .............................. JP2016-045694
Feb. 28, 2017 (JP) .............................. JP2017-035720

(51) Int. Cl.
G03G 15/00       (2006.01)
B41J 29/13       (2006.01)
(Continued)

(52) U.S. Cl.
CPC .......... *G03G 15/6552* (2013.01); *B41J 29/13* (2013.01); *B65H 31/02* (2013.01);
(Continued)

(58) Field of Classification Search
CPC . B41J 29/13; G03G 21/1623; G03G 21/1628; G03G 21/1633; G03G 15/6552
See application file for complete search history.

(56) References Cited

U.S. PATENT DOCUMENTS 5,907,745 A *   5/1999  Azuma .................... B41J 2/435
                                              399/92
2009/0122330 A1*  5/2009  Andoh ............... H04N 1/00525
                                              358/1.13
2010/0329728 A1  12/2010  Irie et al.

FOREIGN PATENT DOCUMENTS

CN        1118890 A      3/1996
CN      101930194 A     12/2010
(Continued)

OTHER PUBLICATIONS

International Preliminary Report on Patentability issued in parent International Application No. PCT/JP2017/008759 dated Sep. 20, 2018.
(Continued)

*Primary Examiner* — Jennifer Bahls
*Assistant Examiner* — Quang X Nguyen
(74) *Attorney, Agent, or Firm* — Venable LLP

(57) ABSTRACT

An image forming apparatus, including: an apparatus main body; an openable and closable member provided on the apparatus main body; an image reading portion configured to read an image of an original, the image reading portion being supported on the apparatus main body and being movable to a first position and to a second position; and a stopper member configured to move in conjunction with a movement of the image reading portion, wherein when the image reading portion is moved to the first position, the stopper member is moved to a restricting position for restricting the openable and closable member from moving from a closed position to an open position, and wherein when the image reading portion is moved to the second position, the stopper member is moved to an allowing position for allowing the openable and closable member to move from the closed position to the open position.

16 Claims, 15 Drawing Sheets

(51) Int. Cl.
  *G03G 21/16*    (2006.01)
  *B65H 31/02*    (2006.01)
  *H04N 1/00*     (2006.01)

(52) U.S. Cl.
  CPC ..... *G03G 21/1628* (2013.01); *G03G 21/1633* (2013.01); *H04N 1/00* (2013.01); *B65H 2301/4212* (2013.01); *B65H 2405/115* (2013.01); *B65H 2405/1117* (2013.01); *B65H 2405/121* (2013.01); *B65H 2801/06* (2013.01); *G03G 15/60* (2013.01); *G03G 15/6573* (2013.01); *G03G 2215/00421* (2013.01)

(56) References Cited

FOREIGN PATENT DOCUMENTS

| | | |
|---|---|---|
| JP | H11-69046 A | 3/1999 |
| JP | H11-95515 A | 4/1999 |
| JP | 2000-112198 A | 4/2000 |
| JP | 2007-17834 A | 1/2007 |
| JP | 2009-300930 A | 12/2009 |
| JP | 2012-27256 A | 2/2012 |
| JP | 2015-170811 A | 9/2015 |

OTHER PUBLICATIONS

International Search Report and Written Opinion issued in parent International Application No. PCT/JP2017/008759 dated Mar. 28, 2017.
European Search Report issued in European Application No. 17763171.0 dated Nov. 11, 2019.
Chinese Office Action, dated Jun. 1, 2020, in corresponding Chinese Application No. 201780016109.6.
Office Action dated Feb. 8, 2021 in counterpart Chinese Application No. 201780016109.6, together with English translation thereof.
Office Action dated Jan. 19, 2021 in counterpart Japanese Application No. 2017-035720, together with English translation thereof.
European Office Action dated Dec. 6, 2021 in counterpart European Application No. 17763171.0.

* cited by examiner

IMAGE FORMING APPARATUS HAVING STOPPER PREVENTING UNINTENTIONAL OPENING OF MAIN BODY

CROSS-REFERENCE TO RELATED APPLICATIONS

This application is a Continuation of International Patent Application No. PCT/JP2017/008759, filed Mar. 6, 2017, which claims the benefit of Japanese Patent Application No. 2016-045694, filed Mar. 9, 2016, and Japanese Patent Application No. 2017-035720, filed Feb. 28, 2017, all of which are hereby incorporated by reference herein in their entirety.

BACKGROUND OF THE INVENTION

Field of the Invention

The present invention relates to an image forming apparatus such as an electrophotographic copying machine, an electrophotographic printer (a laser beam printer, an LED printer or the like, for example), an inkjet printer, or a facsimile apparatus, for example.

Description of the Related Art

There is an image forming apparatus which includes an openable and closable member, which is openable and closable with respect to an apparatus main body, such as a door which opens and closes an opening for mounting or removing a process cartridge, for example. Further, a configuration is known where a discharge tray for stacking sheets discharged from the inside of an image forming apparatus also functions as such an openable and closable member.

Such an openable and closable member may be opened by a user unintentionally. Particularly, in the case where the discharge tray also functions as the openable and closable member, a user may open the discharge tray unintentionally at the time of removing a sheet on the discharge tray or of handling an extension tray which extends the length of the discharge tray.

When the openable and closable member is erroneously opened during operation of the image forming apparatus, the operation of the apparatus is stopped and, as a result, a sheet under conveyance stays in the image forming apparatus. Accordingly, to restart operation of the image forming apparatus, it is necessary to remove a sheet staying in the inside of the apparatus, and to turn the apparatus on again.

In view of the above, conventionally, a configuration is proposed which prevents a user from opening an openable and closable member unintentionally. For example, Japanese Patent Application Laid-Open No. H11-69046 describes the following configuration. The configuration where a discharge tray also functions as an openable and closable member is provided with a stopper which prevents the discharge tray from being opened, and the stopper is caused to abut against an image reading unit provided at an upper portion of an image forming apparatus thus preventing the discharge tray from being opened. In the configuration described in the Japanese Patent Application Laid-Open No. H11-69046, pivoting the image reading unit in a horizontal direction causes the stopper and the image reading unit to separate from each other so that the discharge tray is brought into an unlocked state wherein the discharge tray can be opened.

However, in the configuration described in the Japanese Patent Application Laid-Open No. H11-69046, for an image forming apparatus with an increase in size, the distance between the image reading unit and the discharge tray increases. When the distance between the openable and closable member and a member against which the stopper abuts increases as described above, it is necessary to increase the size of the stopper and hence, component cost increases.

SUMMARY OF THE INVENTION

The present invention has been made under such circumstances, and it is an object of the present invention to provide an image forming apparatus where a stopper with a small size can prevent a user from opening an openable and closable member unintentionally.

According to a typical configuration of an image forming apparatus of an embodiments of the present invention to achieve the above-mentioned object, the image forming apparatus, which forms an image on a sheet, comprises:

an apparatus main body of the image forming apparatus;

an openable and closable member provided on the apparatus main body in an openable and closable manner;

an image reading portion configured to read an image of an original, the image reading portion being supported on the apparatus main body and being movable to a first position and to a second position having a positional relationship with respect to the apparatus main body different from the first position; and a stopper member provided in the apparatus main body and configured to move in conjunction with a movement of the image reading portion, wherein when the image reading portion is moved to the first position, the stopper member is moved to a restricting position in which the stopper member restricts the openable and closable member from being moved from a closed position to an open position, and wherein when the image reading portion is moved to the second position, the stopper member is moved to an allowing position in which the stopper member allows the openable and closable member to be moved from the closed position to the open position.

Further features of the present invention will become apparent from the following description of exemplary embodiments with reference to the attached drawings.

DESCRIPTION OF THE EMBODIMENTS

First Embodiment

<Image Forming Apparatus>

Hereinafter, first, an overall configuration of an image forming apparatus A according to a first embodiment of the present invention will be described together with an operation performed at the time of forming an image with reference to drawings. Assume that the image forming apparatus A of this embodiment is an electrophotographic laser beam printer.

The image forming apparatus A includes: an image forming portion which transfers a toner image to a sheet (recording medium); an image reading portion 13 which reads an image of an original; a sheet feeding portion which supplies a sheet to the image forming portion; and a fixing portion which causes the toner image to be fixed on the sheet.

Figure 1:
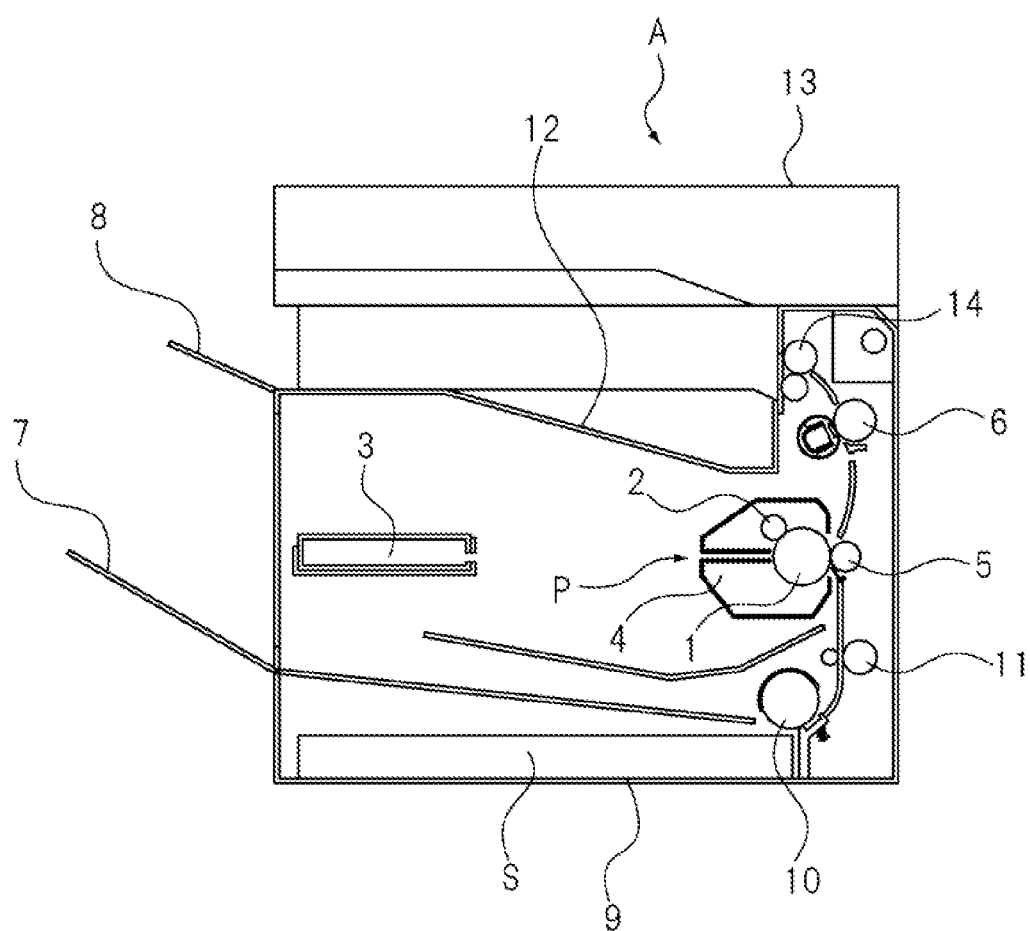
FIG. 1 is a cross-sectional schematic view of an image forming apparatus according to a first embodiment.

As shown in FIG. 1, the image forming portion includes a process cartridge P which is detachably mounted on a main body of the image forming apparatus A, a laser scanner unit 3, a transfer roller 5 and the like. The process cartridge P includes a photosensitive drum 1 (image carrier), a charging roller 2, a developing apparatus 4 and the like.

The image reading portion 13 which reads an image of an original is provided on an upper portion of the image forming apparatus A in a pivotable manner in an upward and downward direction with respect to the apparatus main body. That is, the image reading portion 13 is a member which is provided in a pivotally movable manner with respect to the apparatus main body, and is movable between a first position in which the image reading portion 13 is in an open position (see FIG. 2B) and a second position in which the image reading portion 13 is in a closed position.

In forming an image, when a control portion not shown in the drawing generates a print signal, a sheet S stacked in a sheet stacking portion 9 or a manual feed tray 7 is fed to the image forming portion by a feed roller 10 and a resist roller 11.

On the other hand, in the image forming portion, a charging bias is applied to the charging roller 2 so that a surface of the photosensitive drum 1 which comes into contact with the charging roller 2 is charged.

Thereafter, the laser scanner unit 3 emits a laser beam from a light source (not shown in the drawing) provided in the laser scanner unit 3 to irradiate the photosensitive drum 1. With such irradiation, a potential of the photosensitive drum 1 partially lowers so that an electrostatic latent image corresponding to image information is formed on the surface of the photosensitive drum 1.

Then, the developing apparatus 4 causes toner to be adhered to the electrostatic latent image formed on the surface of the photosensitive drum 1 to form a toner image. The toner image formed on the surface of the photosensitive drum 1 is fed to a transfer nip portion formed between the photosensitive drum 1 and the transfer roller 5. When the toner image arrives at the transfer nip portion, a transfer bias having an opposite polarity to the toner is applied to the transfer roller 5 so that the toner image is transferred to a sheet.

Thereafter, the sheet to which the toner image is transferred is fed to a fixing apparatus 6. The sheet is heated and compressed by a fixing nip portion formed between a heating portion and a compressing portion of the fixing apparatus 6 so that the toner image is fixed to the sheet. After such operations, the sheet is conveyed by a discharge roller 14 to be discharged to a discharge tray 12 disposed below the image reading portion 13.

A sliding-type extension tray 8 which extends a sheet stacking area in a sheet discharging direction is provided at a distal end of the discharge tray 12, and a user can adjust a length of the discharge tray 12 when necessary.

Figure 2A:
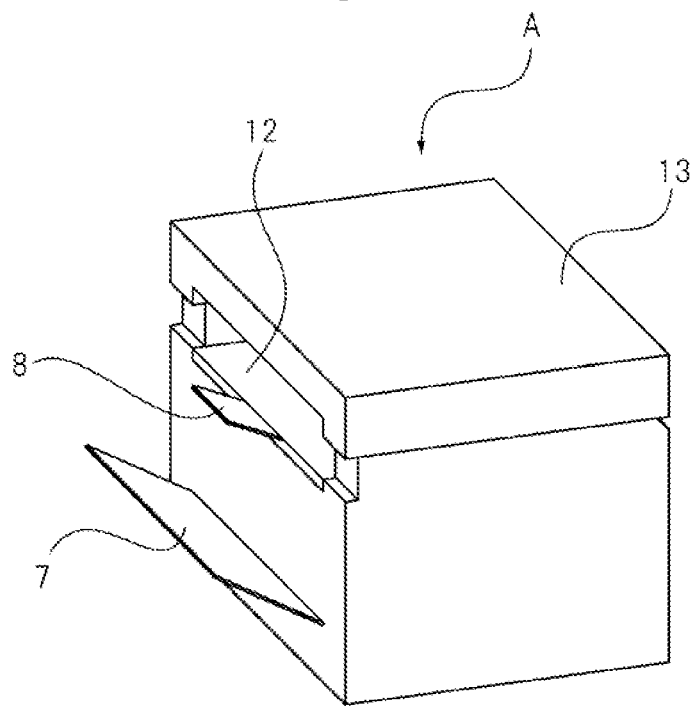
FIG. 2A is a perspective view of the image forming apparatus according to the first embodiment.
Figure 2B:
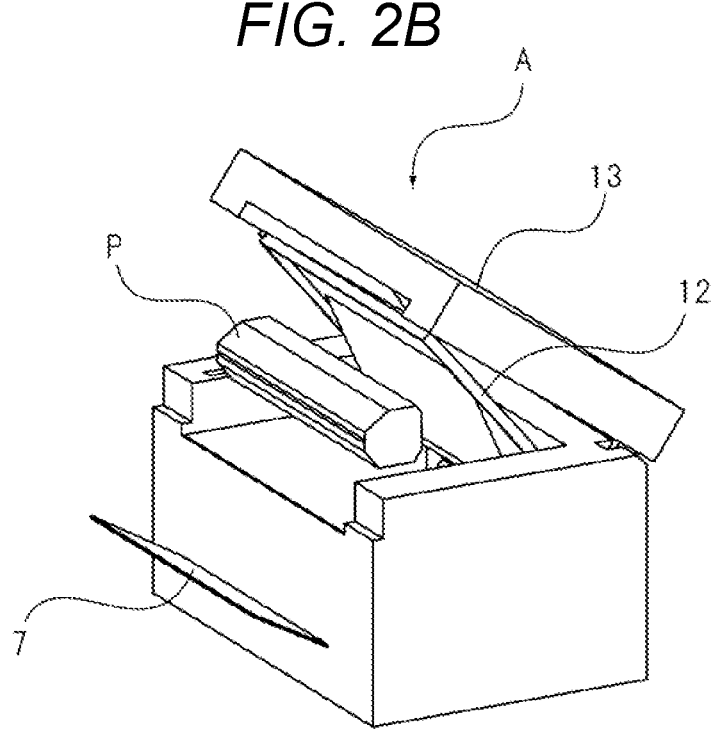
FIG. 2B is a perspective view of the image forming apparatus according to the first embodiment when an image reading portion is in an open position.

As shown in FIG. 2A and FIG. 2B, the image reading portion 13 and the discharge tray 12 are respectively supported in a pivotable manner with respect to the main body of the image forming apparatus A so that pivoting the image reading portion 13 and the discharge tray 12 allows these members to be opened and closed. When the discharge tray 12 is pivoted so as to bring the discharge tray 12 into an open state, the process cartridge P disposed in the image forming apparatus A can be accessed. That is, the discharge tray 12 in this embodiment also functions as an openable and closable member which is supported by the main body of the image forming apparatus A in a pivotable manner, and can be opened and closed by being pivoted.

Figure 12:
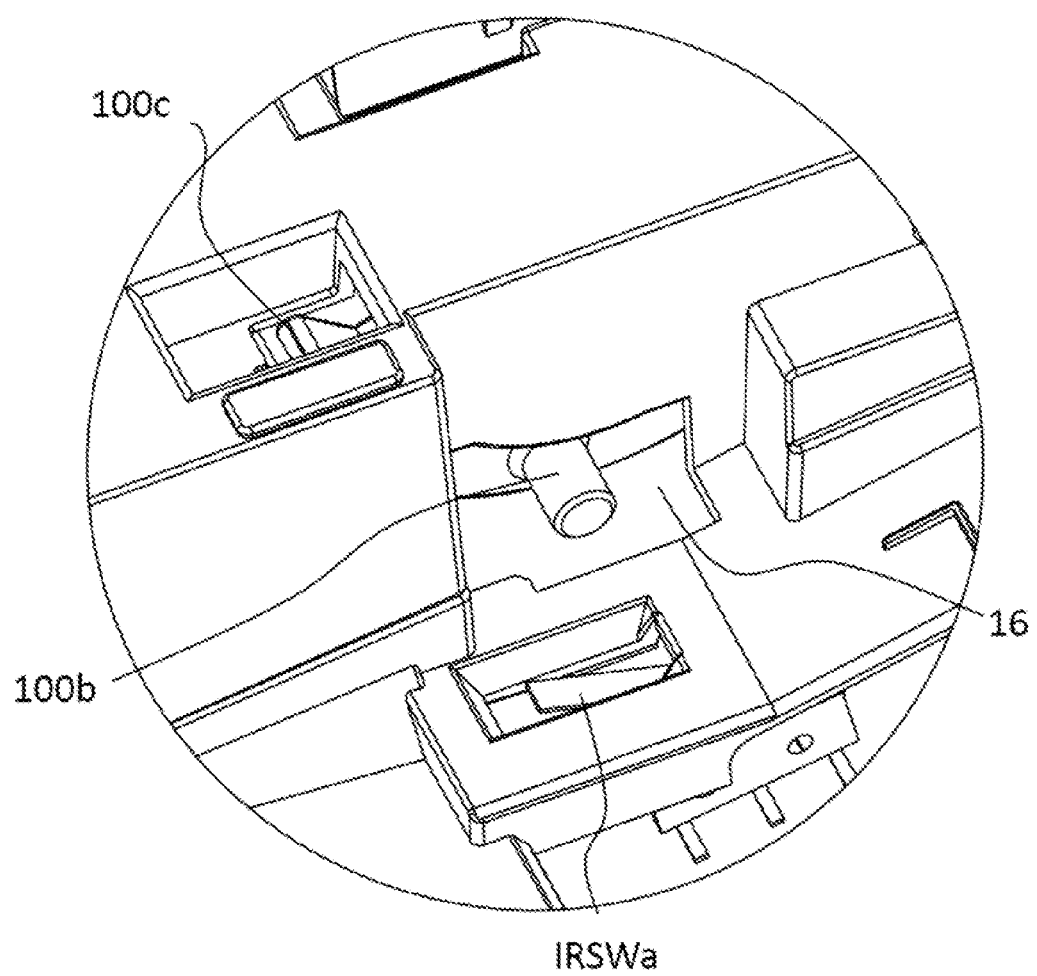
FIG. 12 is a view showing a positional relationship between a stopper and an interlock switch according to the first embodiment.
Figure 14:
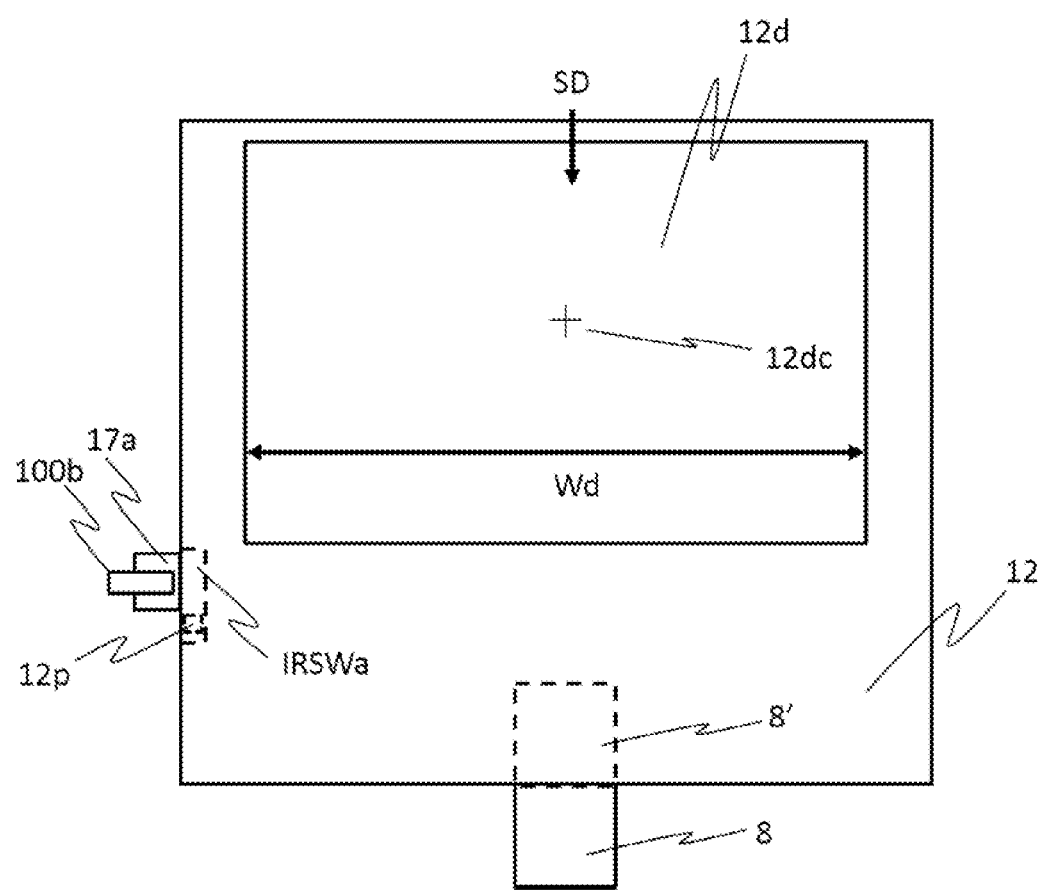
FIG. 14 is a view showing a positional relationship between a movable arm portion of the interlock switch and a tray abutment portion of the stopper in a state where the discharge tray is closed.

An interlock switch IRSW which turns on and off in conjunction with opening and closing of the discharge tray 12 is provided in the inside of the main body of the image forming apparatus A. Accordingly, operation of the main body of the image forming apparatus A is stopped in a state where the discharge tray 12 is open. As shown in FIG. 12 and FIG. 14, the interlock switch IRSW is provided in the vicinity of a tray abutment portion 100b of a stopper 100 described later. FIG. 14 is a view showing a positional relationship between a movable arm portion IRSWa of the interlock switch IRSW and the tray abutment portion 100b of the stopper 100 described later in a state where the discharge tray 12 is closed. FIG. 14 is a view of the discharge tray 12 as viewed from the upper side in the vertical direction, wherein the illustration of the image reading portion 13 is omitted. As shown in FIG. 14, in a direction orthogonal to a sheet discharging direction SD (in a direction perpendicular to the paper surface in FIG. 1), the movable arm portion IRSWa (a movable portion for turning on and off the switch) of the interlock switch IRSW is disposed at a position closer to the tray abutment portion 100b than a center 12dc of a sheet stacking area (a recessed region of the tray) Wd of the discharge tray 12. To be more precise, the movable arm portion IRSWa of the interlock switch IRSW is disposed at a position closer to the tray abutment portion 100b than the sheet stacking area Wd of the discharge tray 12. In FIG. 14, numeral 8' indicates a state where the extension tray 8 is slid thus being accommodated in the discharge tray 12.

The image reading portion 13 and the discharge tray 12 are provided so as not to interfere with each other in a state where the image reading portion 13 is positioned in a closed position, and the discharge tray 12 is closed.

<Stopper>

Figure 3A:
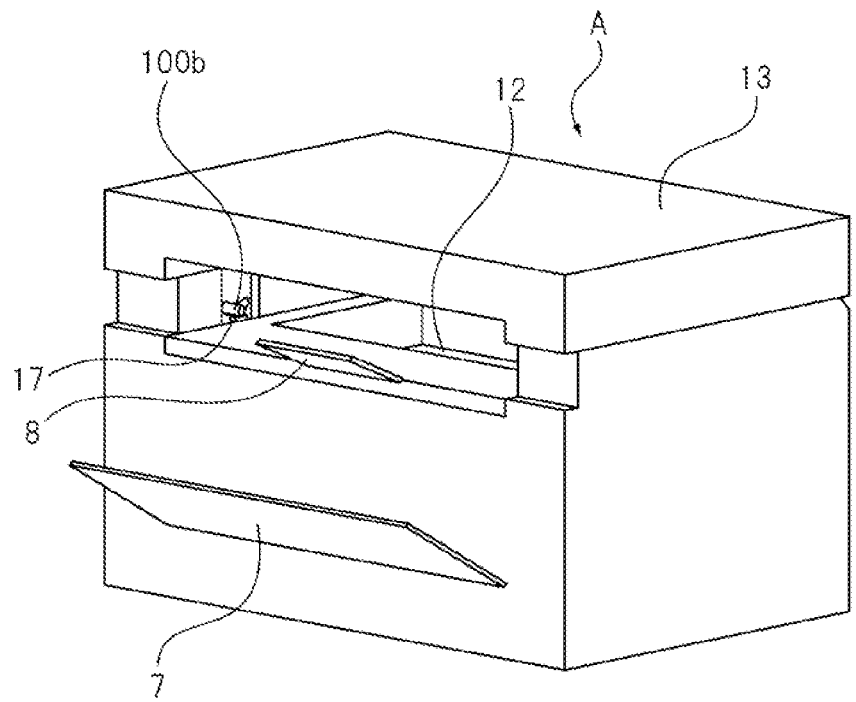
FIG. 3A is a perspective view of the image forming apparatus according to the first embodiment in a state where a discharge tray is closed.

Next, the stopper 100 (stopper member) for preventing a user from erroneously opening the discharge tray 12 unintentionally will be described. FIG. 3A is a perspective view of the image forming apparatus A in a state where the discharge tray 12 is closed, and FIG. 3B is an enlarged cross-sectional view of an area in the vicinity of the discharge tray 12.

Figure 3B:
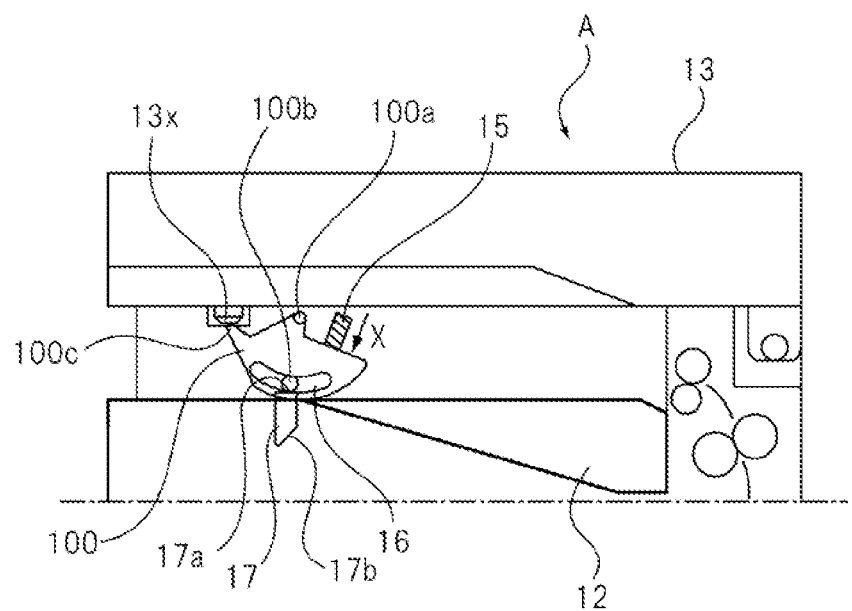
FIG. 3B is an enlarged cross-sectional view of an area in the vicinity of the discharge tray of the image forming apparatus according to the first embodiment.

As shown in FIG. 3B, the stopper 100 is supported by the image forming apparatus A in a pivotable manner about a rotary shaft 100a, and is biased by a spring 15 forming a biasing means in a direction indicated by arrow X. The stopper 100 also includes the tray abutment portion 100b provided so as to pass through a hole portion 16 formed in the main body of the image forming apparatus A. The stopper 100 also includes an abutment portion 100c which abuts against or separates from a stopper abutment portion 13x formed on the image reading portion 13.

Figure 13:
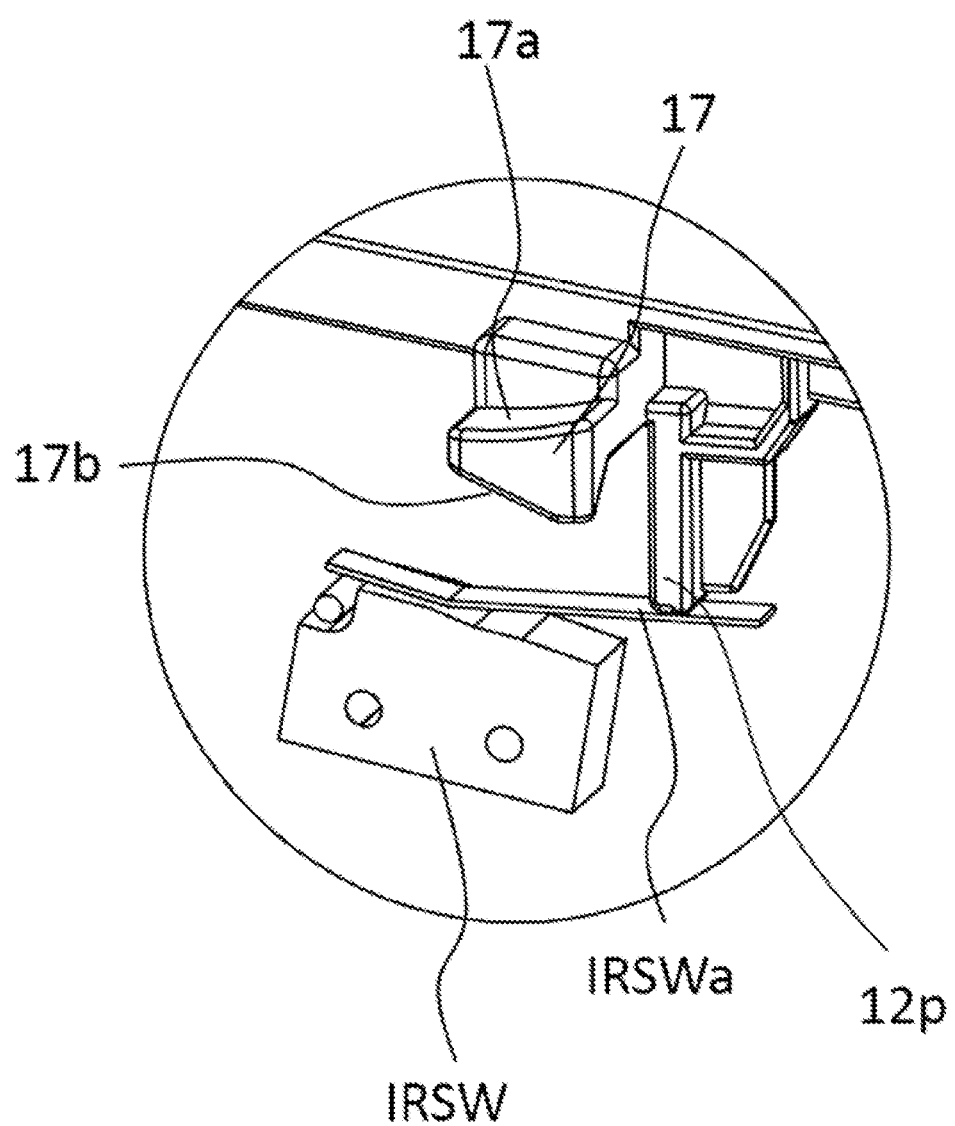
FIG. 13 is a perspective view showing a relationship between a portion of the discharge tray and the interlock switch according to the first embodiment.

The discharge tray 12 includes a stopper receiving portion 17, and the stopper receiving portion 17 includes an abutment portion 17a and an inclined surface 17b. FIG. 13 is a perspective view showing a relationship between a portion of the discharge tray 12 and the interlock switch IRSW. As shown in FIG. 13, the discharge tray 12 also includes, in addition to the stopper receiving portion 17, a pushing portion 12p which pushes the movable arm portion IRSWa of the interlock switch IRSW. FIG. 13 shows a state where the discharge tray 12 is closed with respect to the main body of the image forming apparatus A so that the pushing portion 12p pushes the movable arm portion IRSWa wherein the interlock switch IRSW is in an ON state (a state shown in FIG. 5C described later).

As shown in FIG. 3B, in a state where the discharge tray 12 and the image reading portion 13 are closed, the abutment portion 17a of the stopper receiving portion 17 and the tray abutment portion 100b of the stopper 100 abut against each other so that pivoting of the discharge tray 12 is restricted. The stopper abutment portion 13x which the image reading portion 13 includes and the abutment portion 100c of the stopper 100 abut against each other so that pivoting of the stopper 100 is also restricted. Accordingly, in a state where the discharge tray 12 and the image reading portion 13 are closed, the stopper 100 is positioned in a restricting position in which the stopper 100 restricts a movement of the discharge tray (openable and closable member) 12 from a closed position to an open position. Therefore, the discharge tray 12 is held in a closed state.

<Opening and Closing Operation of Discharge Tray>

Next, operation of opening and closing the discharge tray 12 will be described. First, operation of opening the discharge tray 12 will be described with reference to FIG. 4A and FIG. 4B.

Figure 4A:
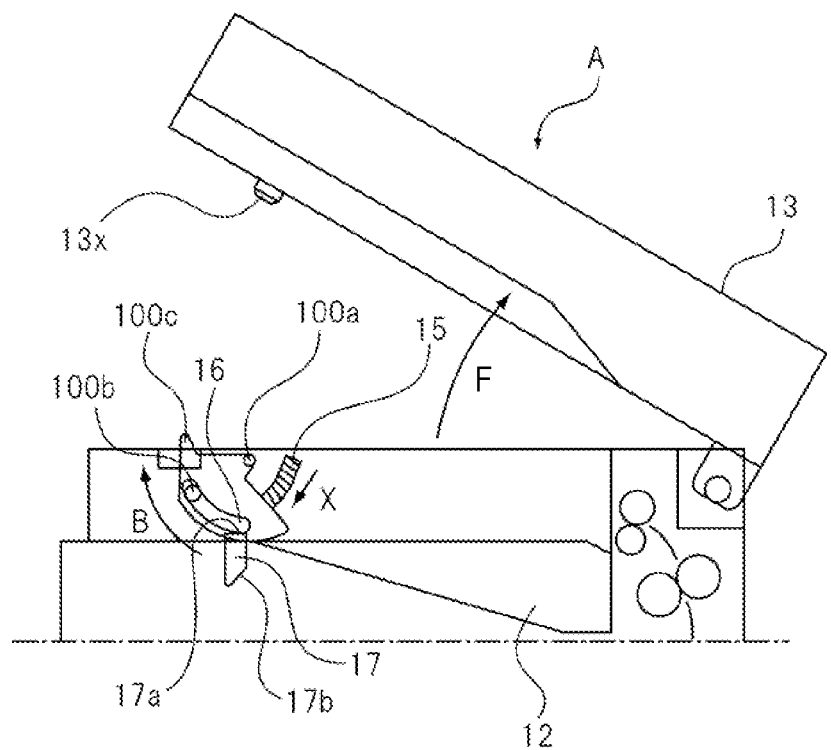
FIG. 4A is a cross-sectional view for describing operation of opening the discharge tray according to the first embodiment.

As shown in FIG. 4A, when the image reading portion 13 is pivoted first in a direction indicated by arrow F from a closed state thus being moved to an open position, the stopper abutment portion 13x separates from the abutment portion 100c of the stopper 100. With such separation, the stopper 100 pivots in a direction indicated by arrow B due to a biasing force of the spring 15 in the X direction so that the tray abutment portion 100b also moves inside the hole portion 16 in the direction indicated by arrow B. With such movement, the tray abutment portion 100b and the abutment portion 17a of the stopper receiving portion 17 separate from each other.

Figure 4B:
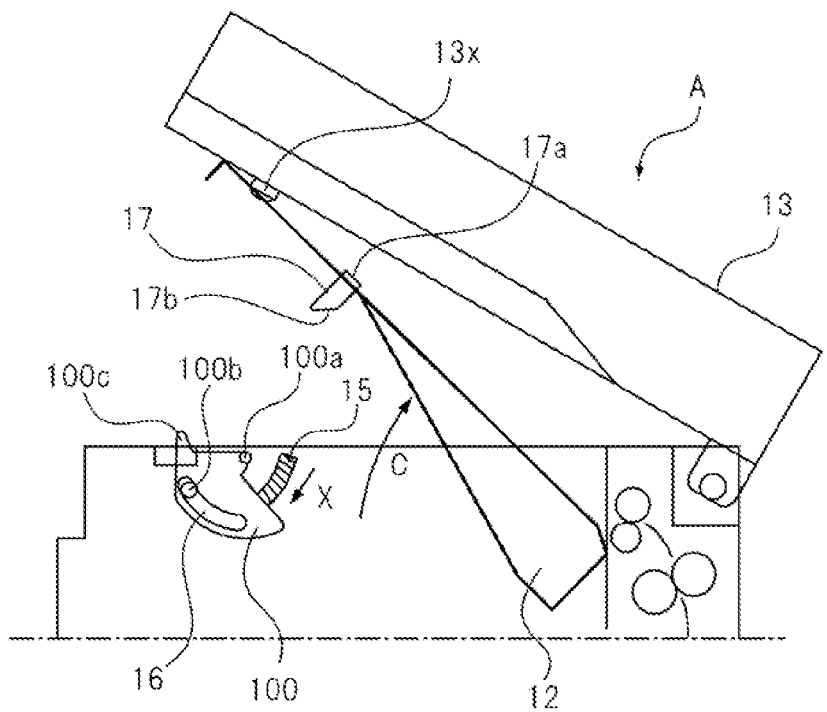
FIG. 4B is a cross-sectional view for describing the operation of opening the discharge tray according to the first embodiment.

When the tray abutment portion 100b and the abutment portion 17a of the stopper receiving portion 17 separate from each other, locking of the discharge tray 12 which is caused by the stopper 100 is unlocked so that the discharge tray 12 is brought into an openable state. That is, in conjunction with operation of opening the image reading portion 13, the stopper 100 moves to a position in which the stopper 100 brings the discharge tray 12 into an openable state (allowing position). Accordingly, as shown in FIG. 4B, causing the discharge tray 12 to pivot in a direction indicated by arrow C allows the discharge tray 12 to be opened.

Next, operation of closing the discharge tray 12 and the image reading portion 13 will be described.

Operation of closing the discharge tray 12 first and, then, closing the image reading portion 13 will be described. This operation is reverse of the above-mentioned operation of opening the discharge tray 12. That is, when the discharge tray 12 is closed and, thereafter, the image reading portion 13 is closed, the stopper abutment portion 13x of the image reading portion 13 pushes the abutment portion 100c of the stopper 100 so that the stopper 100 moves. When the image reading portion 13 moves to a closed position, a state is brought about where the tray abutment portion 100b and the abutment portion 17a of the stopper receiving portion 17 abut against each other so that pivoting of the discharge tray 12 is restricted. With such a restriction, the discharge tray 12 is held in a closed state.

Figure 5A:
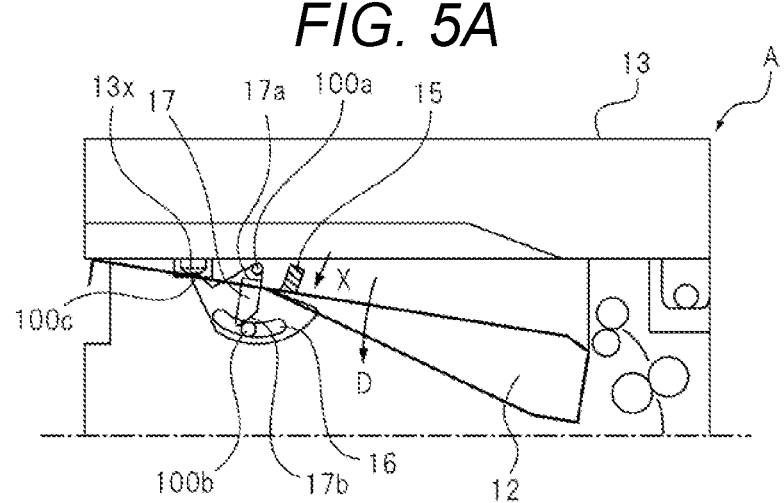
FIG. 5A is a cross-sectional view for describing operation of closing the discharge tray according to the first embodiment.

Next, operation of closing the image reading portion 13 and, thereafter, closing the discharge tray 12 will be described with reference to FIG. 5A, FIG. 5B and FIG. 5C. As shown in FIG. 5A, when the image reading portion 13 is closed first, the abutment portion 100c of the stopper 100 is pushed by the stopper abutment portion 13x of the image reading portion 13 so that the stopper 100 moves to a restricting position. Causing the discharge tray 12 to pivot in a direction indicated by arrow D in such a state allows the inclined surface 17b of the stopper receiving portion 17, which the discharge tray 12 includes, and the tray abutment portion 100b to abut against each other.

Figure 5B:
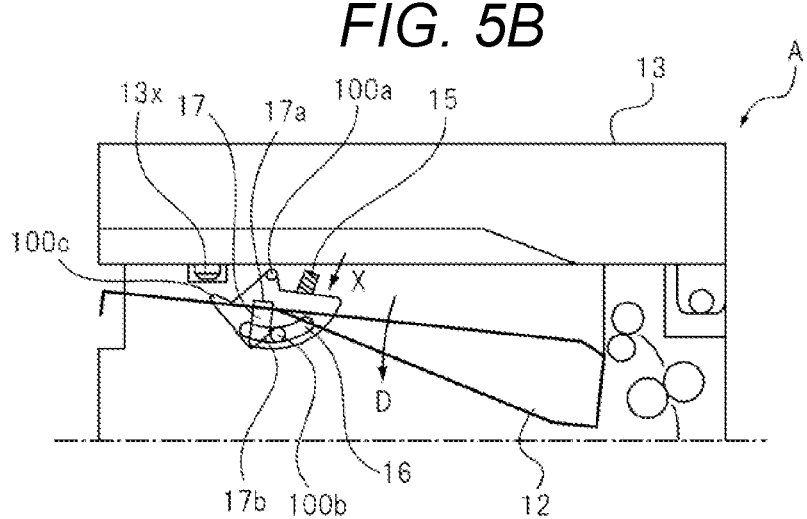
FIG. 5B is a cross-sectional view for describing the operation of closing the discharge tray according to the first embodiment.

When the discharge tray 12 is further pivoted in the direction indicated by arrow D, as shown in FIG. 5B, the tray abutment portion 100b receives a force from the inclined surface 17b to move along the inclined surface 17b. At this time of operation, the stopper abutment portion 13x of the image reading portion 13 and the abutment portion 100c of the stopper 100 temporarily separate from each other.

Figure 5C:
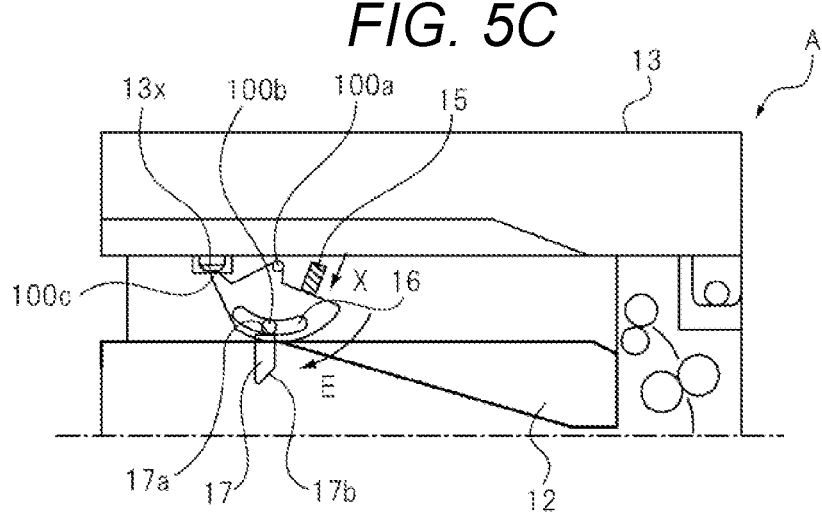
FIG. 5C is a cross-sectional view for describing the operation of closing the discharge tray according to the first embodiment.

When the discharge tray 12 is further pivoted in the direction indicated by arrow D so that the discharge tray 12 is pivoted to a closed state, as shown in FIG. 5C, the stopper receiving portion 17 moves to the position below the hole portion 16. With such movement, the stopper 100 pivots in a direction indicated by arrow E due to a biasing force of the spring 15 in the X direction. With such an operation, the stopper abutment portion 13x of the image reading portion 13 and the abutment portion 100c of the stopper 100 abut against each other again so that pivoting of the stopper 100 is restricted. When the stopper 100 is in a position in which pivoting of the stopper 100 is restricted, a state is brought about where the tray abutment portion 100b and the abutment portion 17a of the stopper receiving portion 17 abut against each other. Due to such abutment, pivoting of the discharge tray 12 is restricted, and the discharge tray 12 is held in a closed state. As described above, when the discharge tray is moved toward a closed position from a state where the stopper 100 is positioned in a restricting position and the discharge tray 12 is in an open position, the stopper 100 moves from the restricting position and, upon arrival of the discharge tray 12 into the closed position, the stopper 100 returns into the restricting position. FIG. 12 is a perspective view in a state where the stopper 100 is in a position shown in FIG. 5C. In FIG. 12, the discharge tray 12 and the image reading portion 13 are omitted. As described previously, in a state shown in FIG. 5C, the interlock switch IRSW is in an ON state (see FIG. 13).

As described above, the stopper 100 is configured to be movable in conjunction with the movement of the image reading portion 13 so that the stopper 100 with a small size can prevent a user from opening the discharge tray 12 unintentionally. Accordingly, manufacturing cost of the stopper 100 can be reduced.

Further, it is possible to prevent that a user opens the discharge tray 12 unintentionally and, as a result, operation of the image forming apparatus A stops. Accordingly, it becomes unnecessary to perform removal of a sheet staying due to stopping of the operation.

This configuration does not have a biasing force for biasing the discharge tray 12 in the opening direction and hence, when the image reading portion 13 moves to an open position, a closed state of the discharge tray 12 can be maintained. Accordingly, a sheet can be easily removed when the sheet is on the discharge tray 12.

By providing the inclined surface 17b on the stopper receiving portion 17, the configuration is adopted where the discharge tray 12 is movable to a closed position in a state where the image reading portion 13 is closed and the stopper 100 is in a restricting position. Accordingly, either of the image reading portion 13 or the discharge tray 12 may be closed first. Therefore, a user is not required to pay attention to the order of handling and hence, usability is enhanced.

The image reading portion 13 is configured to be movable in the upward and downward direction. Accordingly, compared to a configuration where the image reading portion 13 is moved in a horizontal direction, an operation space for bringing the discharge tray into an openable state can be reduced in size.

Further, as described previously, in a direction (a direction perpendicular to the paper surface in FIG. 1) orthogonal to the sheet discharging direction SD, the movable arm portion IRSWa of the interlock switch IRSW is disposed at a position closer to the tray abutment portion 100b than the center 12dc of the sheet stacking area Wd of the discharge tray 12. With such a configuration, compared to the case where the movable arm portion IRSWa is disposed at a position farther away from the tray abutment portion 100b than the center 12dc of the sheet stacking area Wd, it is possible to suppress that the interlock switch IRSW is carelessly turned off. It is more preferable that the movable arm portion IRSWa be disposed at a position closer to the tray abutment portion 100b than the sheet stacking area Wd of the discharge tray 12 as in the case of this embodiment.

In this embodiment, the spring 15 is used for biasing the stopper 100. However, the present invention is not limited to such a configuration. Substantially the same advantageous effects can be acquired even if the self-weight of the stopper 100 is utilized.

Second Embodiment

Next, a configuration of an image forming apparatus A according to a second embodiment of the present invention will be described. Components substantially equal to corresponding components which have been described in the above-mentioned first embodiment are given the same symbols, and the description of such components is omitted.

<Stopper>

Figure 6A:
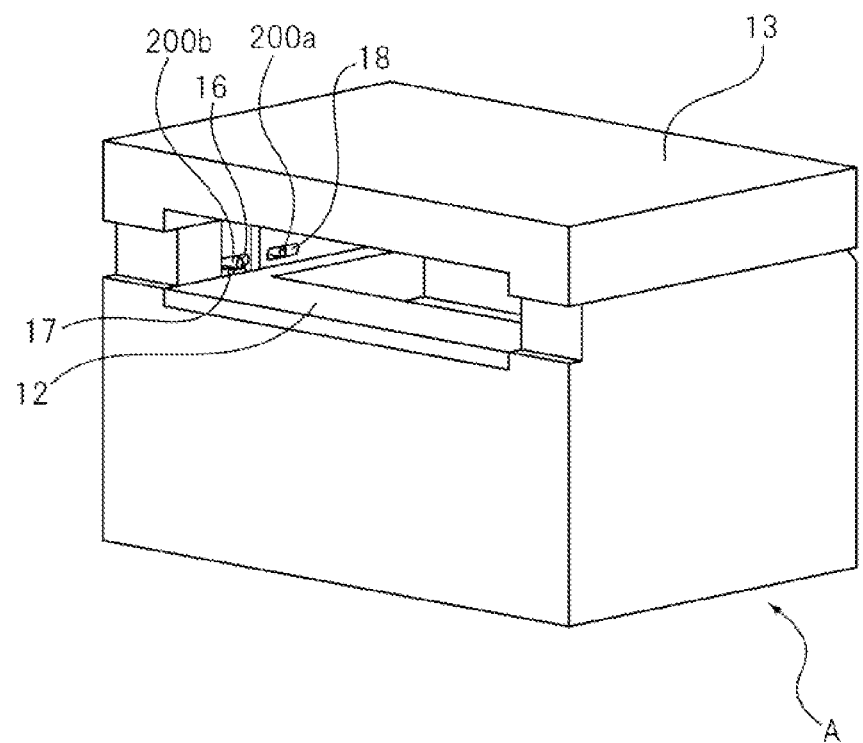
FIG. 6A is a perspective view of an image forming apparatus according to a second embodiment in a state where a discharge tray is closed.

First, a configuration of a stopper 200 (stopper member) according to this embodiment will be described. FIG. 6A is a perspective view of the image forming apparatus A in a state where a discharge tray 12 is closed, and FIG. 6B is an enlarged cross-sectional view of an area in the vicinity of the discharge tray 12.

Figure 6B:
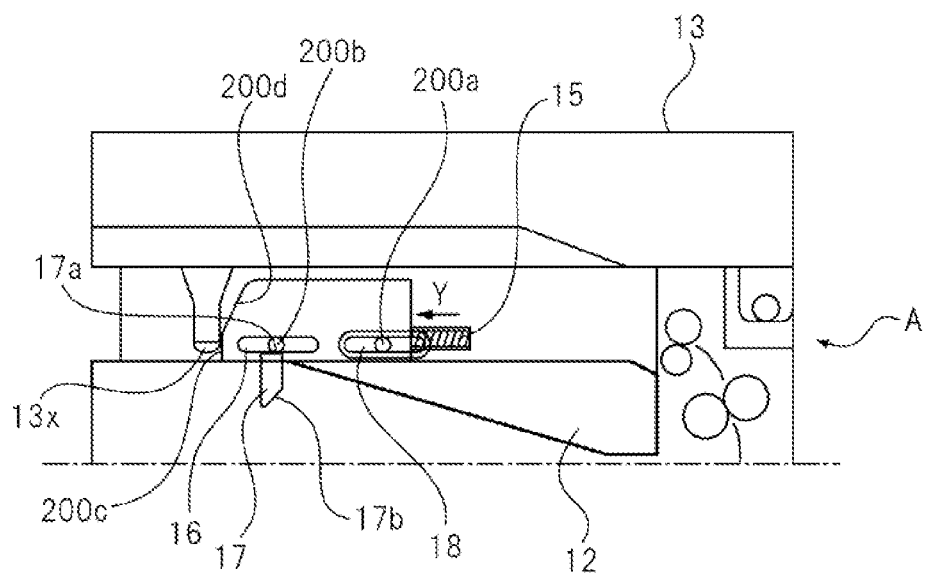
FIG. 6B is a cross-sectional view of the image forming apparatus according to the second embodiment in a state where the discharge tray is closed.

As shown in FIG. 6A and FIG. 6B, the stopper 200 is configured such that the stopper 200 has a guide boss 200a, and the guide boss 200a is engaged with a guide hole 18 formed in a main body of the image forming apparatus A thus being movable in a sliding manner. Further, the stopper 200 is biased by a spring 15 (biasing means) in a direction indicated by arrow Y. The stopper 200 also includes a tray abutment portion 200b provided so as to pass through a hole portion 16 formed in the main body of the image forming apparatus A. The stopper 200 also includes an abutment portion 200c which abuts against or separates from a stopper abutment portion 13x formed on the image reading portion 13. The stopper 200 also has an inclined surface 200d.

As shown in FIG. 6B, in a state where the discharge tray 12 and the image reading portion 13 are closed, the abutment portion 17a of the stopper receiving portion 17 and the tray abutment portion 200b of the stopper 200 abut against each other so that pivoting of the discharge tray 12 is restricted. The stopper abutment portion 13x which the image reading portion 13 includes and the abutment portion 200c of the stopper 200 abut against each other so that movement of the stopper 200 is also restricted. Accordingly, in a state where the discharge tray 12 and the image reading portion 13 are closed, the stopper 200 is positioned in a restricting position in which the stopper 200 holds a state where the discharge tray 12 is closed. Therefore, the discharge tray 12 is held in a closed state.

<Opening and Closing Operation of Discharge Tray>

Next, operation of opening and closing the discharge tray 12 will be described. First, operation of opening the discharge tray 12 will be described with reference to FIG. 7A and FIG. 7B.

Figure 7A:
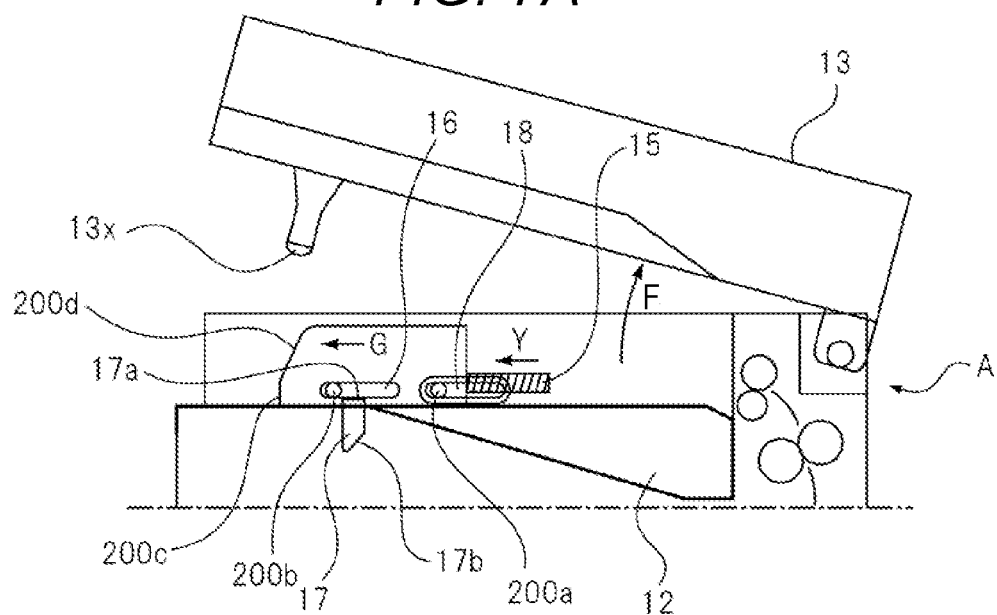
FIG. 7A is a cross-sectional view for describing operation of opening the discharge tray according to the second embodiment.

As shown in FIG. 7A, when the image reading portion 13 is pivoted first in a direction indicated by arrow F from a closed state, the stopper abutment portion 13x separates from the abutment portion 200c of the stopper 200. With such separation, the stopper 200 moves in a direction indicated by arrow G in a sliding manner due to a biasing force of the spring 15 in a Y direction so that the tray abutment portion 200b also moves inside the hole portion 16 in the direction indicated by arrow G. With such movement, the tray abutment portion 200b and the abutment portion 17a of the stopper receiving portion 17 separate from each other.

Figure 7B:
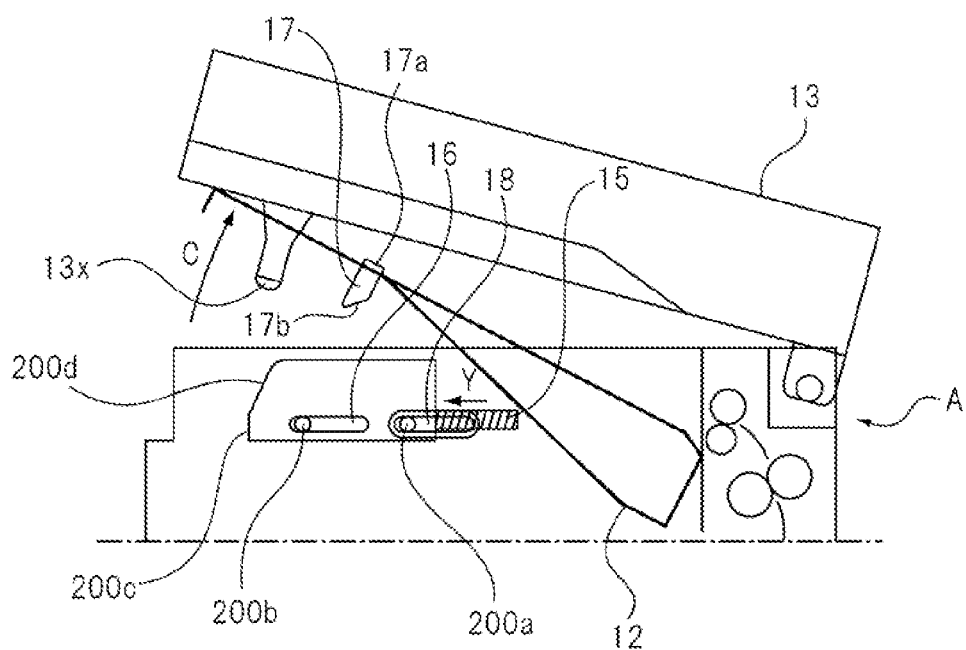
FIG. 7B is a cross-sectional view for describing the operation of opening the discharge tray according to the second embodiment.

When the tray abutment portion 200b and the abutment portion 17a of the stopper receiving portion 17 separate from each other, locking of the discharge tray 12 which is caused by the stopper 200 is unlocked so that the discharge tray 12 is brought into an openable state. That is, in conjunction with operation of opening the image reading portion 13, the stopper 200 moves to a position in which the stopper 200 brings the discharge tray 12 into an openable state. Accordingly, as shown in FIG. 7B, causing the discharge tray 12 to pivot in a direction indicated by arrow C allows the discharge tray 12 to be opened.

Next, operation of closing the discharge tray 12 and the image reading portion 13 will be described.

Operation of closing the discharge tray 12 first and, then, closing the image reading portion 13 will be described. This operation is reverse of the above-mentioned operation of opening the discharge tray 12. That is, when the discharge tray 12 is closed and, thereafter, the image reading portion 13 is closed, the stopper abutment portion 13x of the image reading portion 13 pushes the abutment portion 200c while moving downward along the inclined surface 200d of the stopper 200 so that the stopper 200 moves. When the image reading portion 13 moves to a closed position, a state is brought about where the tray abutment portion 200b and the abutment portion 17a of the stopper receiving portion 17 abut against each other so that pivoting of the discharge tray 12 is restricted. With such a restriction, the discharge tray 12 is held in a closed state.

Figure 8A:
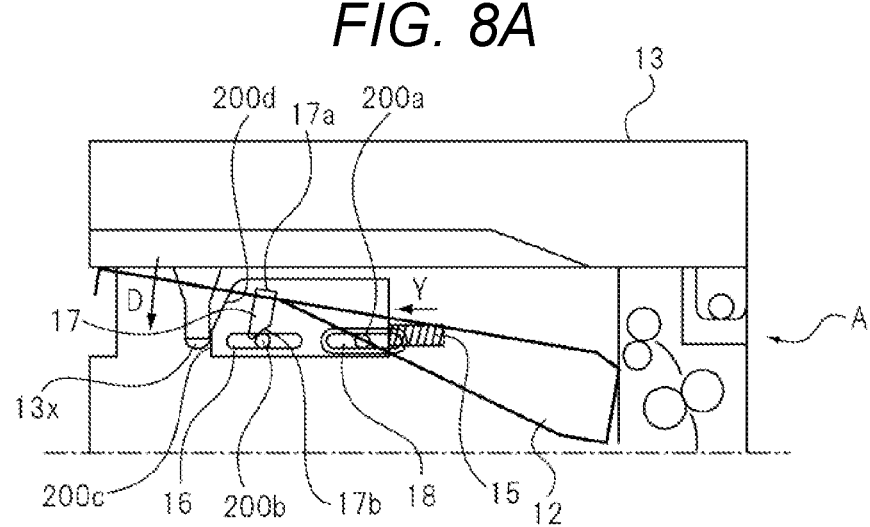
FIG. 8A is a cross-sectional view for describing operation of closing the discharge tray according to the second embodiment.

Next, operation of closing the image reading portion 13 and, thereafter, closing the discharge tray 12 will be described with reference to FIG. 8A, FIG. 8B and FIG. 8C. As shown in FIG. 8A, when the image reading portion 13 is closed first, the abutment portion 200c of the stopper 200 is pushed by the stopper abutment portion 13x of the image reading portion 13 so that the stopper 200 moves to a restricting position. Causing the discharge tray 12 to pivot in a direction indicated by arrow D in such a state allows the inclined surface 17b of the stopper receiving portion 17, which the discharge tray 12 includes, and the tray abutment portion 200b abut against each other.

Figure 8B:
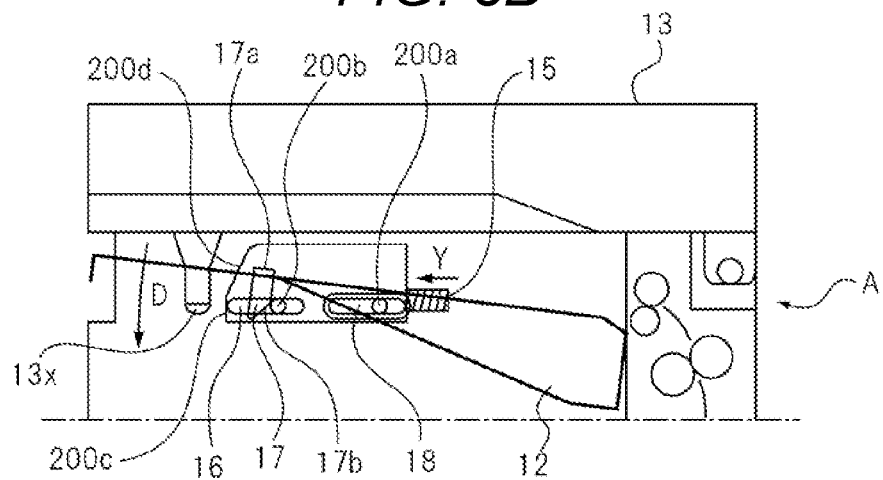
FIG. 8B is a cross-sectional view for describing the operation of closing the discharge tray according to the second embodiment.

When the discharge tray 12 is further pivoted in the direction indicated by arrow D, as shown in FIG. 8B, the tray abutment portion 200b receives a force from the inclined surface 17b to move along the inclined surface 17b. At this time of operation, the stopper abutment portion 13x of the image reading portion 13 and the abutment portion 200c of the stopper 200 temporarily separate from each other.

Figure 8C:
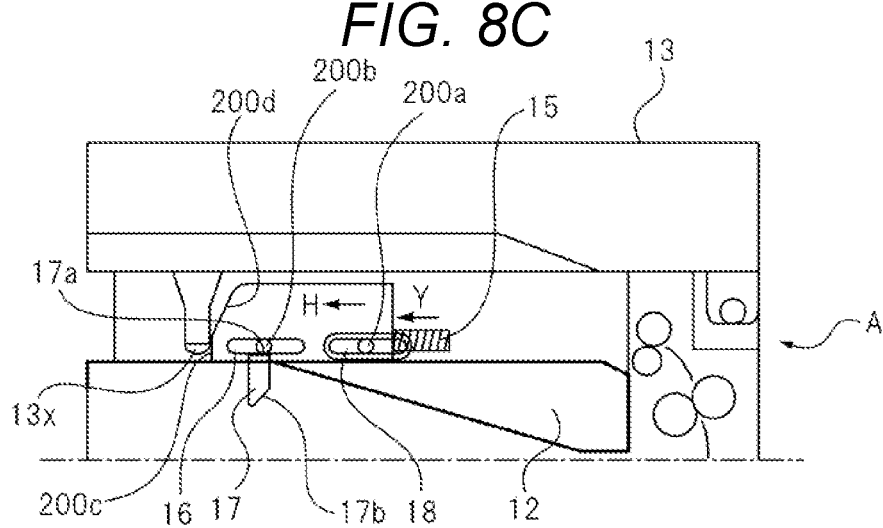
FIG. 8C is a cross-sectional view for describing the operation of closing the discharge tray according to the second embodiment.

When the discharge tray 12 is further pivoted in the direction indicated by arrow D so that the discharge tray 12 is pivoted to a closed state, as shown in FIG. 8C, the stopper receiving portion 17 moves to the position below the hole portion 16. With such movement, the guide boss 200a of the stopper 200 moves in a direction indicated by arrow H along the guide hole 18 due to a biasing force of the spring 15 in the Y direction. With such movement, the stopper abutment portion 13x of the image reading portion 13 and the abutment portion 200c of the stopper 200 abut against each other again so that movement of the stopper 200 is restricted. When the stopper 200 is in a position in which movement of the stopper 200 is restricted, a state is brought about where the tray abutment portion 200b and the abutment portion 17a of the stopper receiving portion 17 abut against each other. Due to such abutment, pivoting of the discharge tray 12 is restricted, and the discharge tray 12 is held in a closed state.

As described above, the stopper 200 is configured to be movable in conjunction with the movement of the image reading portion 13 so that the stopper 200 with a small size can prevent a user from opening the discharge tray 12 unintentionally. Accordingly, manufacturing cost of the stopper 200 can be reduced.

Further, it is possible to prevent that a user opens the discharge tray 12 unintentionally and, as a result, operation of the image forming apparatus A stops. Accordingly, it becomes unnecessary to perform removal of a sheet staying due to stopping of the operation.

This configuration does not have a biasing force for biasing the discharge tray 12 in the opening direction and hence, when the image reading portion 13 moves to an open position, a closed state of the discharge tray 12 can be maintained. Accordingly, a sheet can be easily removed when the sheet is on the discharge tray 12.

By providing the inclined surface 17b on the stopper receiving portion 17, the configuration is adopted where the discharge tray 12 is movable to a closed position in a state where the image reading portion 13 is closed and the stopper 200 is in a restricting position. Accordingly, either of the image reading portion 13 or the discharge tray 12 may be closed first. Therefore, a user is not required to pay attention to the order of handling and hence, usability is enhanced.

The image reading portion 13 is configured to be movable in the upward and downward direction. Accordingly, compared to a configuration where the image reading portion 13 is moved in a horizontal direction, an operation space for bringing the discharge tray 12 into an openable state can be reduced in size.

In this embodiment, the spring 15 is used for biasing the stopper 200. However, substantially the same advantageous effects can be acquired even if a configuration is adopted where the guide hole 18 is angled so that the stopper 200 is biased by the self-weight of the stopper 200.

Third Embodiment

Next, a configuration of an image forming apparatus A according to a third embodiment of the present invention will be described. Components substantially equal to corresponding components which have been described in the above-mentioned first embodiment and second embodiment are given the same symbols, and the description of such components is omitted.

In this embodiment, the description is made by taking a cartridge door 20, which is opened and closed at the time of mounting or removing a process cartridge P, as an example of an openable and closable member.

Figure 9A:
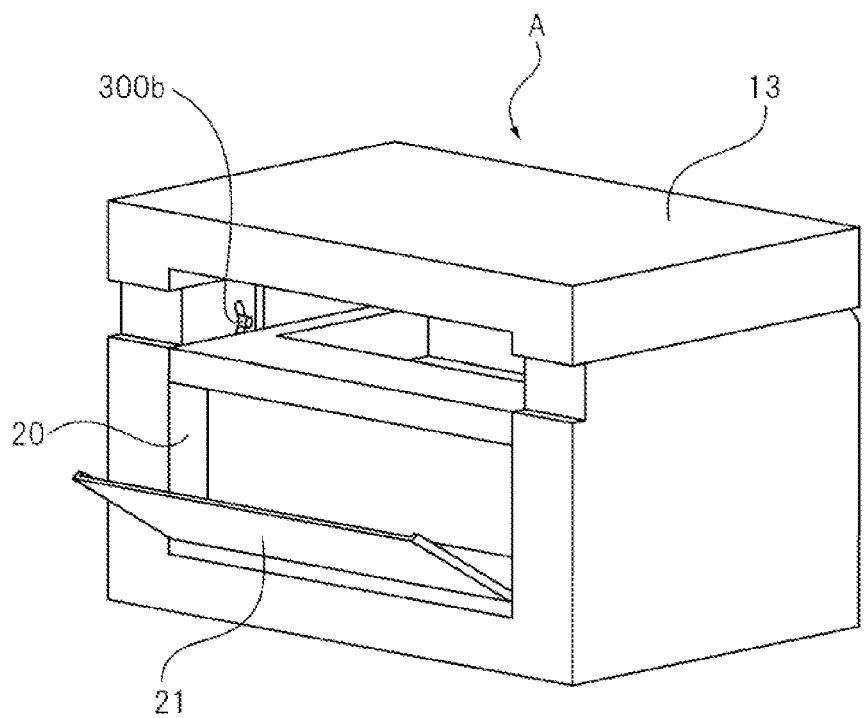
FIG. 9A is a perspective view of an image forming apparatus according to a third embodiment.
Figure 9B:
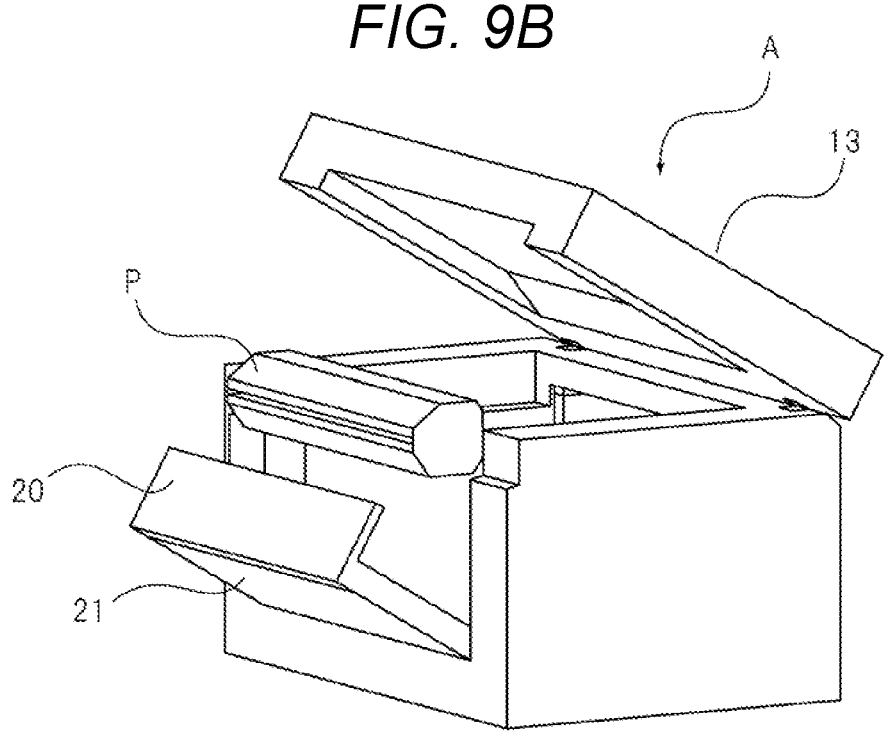
FIG. 9B is a perspective view of the image forming apparatus according to the third embodiment in a state where a cartridge door is open.

First, the configuration of the image forming apparatus A of this embodiment will be described. As shown in FIG. 9A and FIG. 9B, the image reading portion 13 and the cartridge door 20 are respectively supported on the main body of the image forming apparatus A in a pivotable manner so that pivoting the image reading portion 13 and the cartridge door 20 allows these members to be opened and closed. When the cartridge door 20 is pivoted so as to bring the cartridge door 20 into an open state, the process cartridge P disposed in the image forming apparatus A can be accessed. That is, the cartridge door 20 in this embodiment forms an openable and closable member which is supported in a pivotable manner with respect to the main body of the image forming apparatus A, and can be opened and closed by being pivoted.

The image reading portion 13 and the cartridge door 20 are provided so as not to interfere with each other in a state where the image reading portion 13 is positioned in a closed position, and the cartridge door 20 is closed.

As shown in FIG. 9B, the cartridge door 20 and a manual feed tray 21 can pivot as an integral body.

<Stopper>

Figure 10A:
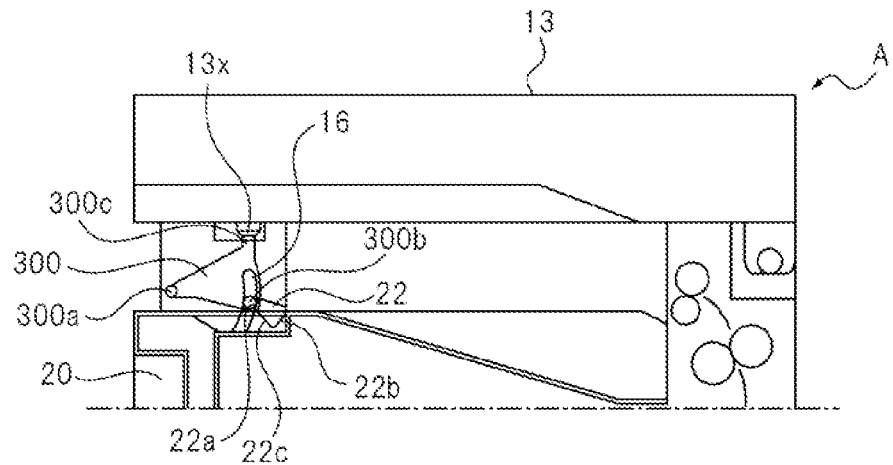
FIG. 10A is a cross-sectional view for describing operation of opening the cartridge door according to the third embodiment.

Next, a stopper 300 (stopper member) according to this embodiment will be described. FIG. 10A is an enlarged cross-sectional view of an area in the vicinity of the cartridge door 20 in a state where the cartridge door 20 is closed.

As shown in FIG. 10A, the stopper 300 is supported by the main body of the image forming apparatus A in a pivotable manner about a rotary shaft 300a, and is biased by a spring (biasing means) not shown in the drawing. The stopper 300 also includes a tray abutment portion 300b provided so as to pass through a hole portion 16 formed in the main body of the image forming apparatus A. The stopper 300 also includes an abutment portion 300c which abuts against or separates from a stopper abutment portion 13x formed on the image reading portion 13.

The cartridge door 20 includes a stopper receiving portion 22, and the stopper receiving portion 22 includes an abutment portion 22a, an inclined surface 22b, and an inclined surface 22c.

As shown in FIG. 10A, in a state where the cartridge door 20 and the image reading portion 13 are closed, the abutment portion 22a of the stopper receiving portion 22 and the tray abutment portion 300b of the stopper 300 abut against each other so that pivoting of the cartridge door 20 is restricted. The stopper abutment portion 13x which the image reading portion 13 includes and the abutment portion 300c of the stopper 300 abut against each other so that pivoting of the stopper 300 is restricted. Accordingly, in a state where the cartridge door 20 and the image reading portion 13 are closed, the stopper 300 is positioned in a restricting position in which the stopper 300 holds a state where the cartridge door 20 is closed. Therefore, the cartridge door 20 is held in a closed state.

<Opening and Closing Operation of Cartridge Door>

Next, operation of opening and closing the cartridge door 20 will be described. First, operation of opening the cartridge door 20 will be described.

Figure 10B:
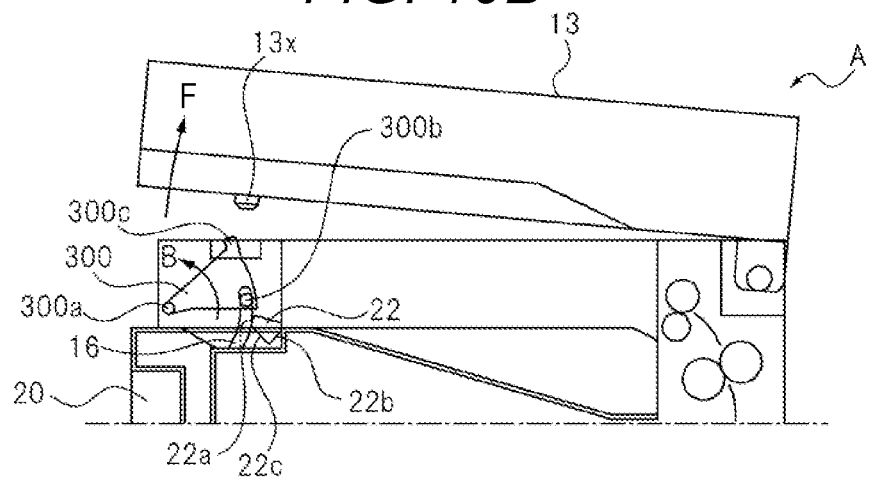
FIG. 10B is a cross-sectional view for describing the operation of opening the cartridge door according to the third embodiment.

As shown in FIG. 10B, when the image reading portion 13 is pivoted first in a direction indicated by arrow F from a closed state, the stopper abutment portion 13x separates from the abutment portion 300c of the stopper 300. With such separation, the stopper 300 biased by a spring not shown in the drawing pivots in a direction indicated by arrow B so that the tray abutment portion 300b also moves inside the hole portion 16 in the direction indicated by arrow B. With such movement, the tray abutment portion 300b and the abutment portion 22a of the stopper receiving portion 22 separate from each other.

Figure 10C:
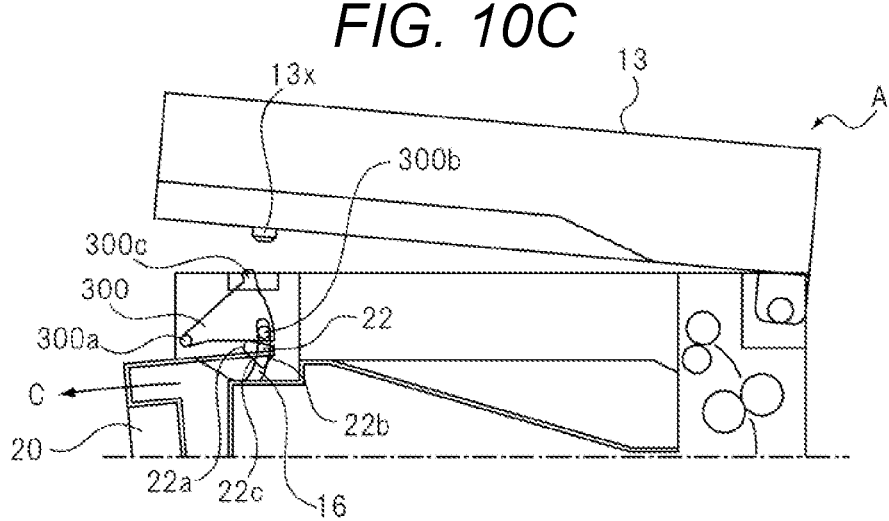
FIG. 10C is a cross-sectional view for describing the operation of opening the cartridge door according to the third embodiment.

When the tray abutment portion 300b and the abutment portion 22a of the stopper receiving portion 22 separate from each other, locking of the cartridge door 20 which is caused by the stopper 300 is unlocked so that the cartridge door 20 is brought into an openable state. That is, in conjunction with operation of opening the image reading portion 13, the stopper 300 moves to a position in which the stopper 300 brings the cartridge door 20 into an openable state. Accordingly, as shown in FIG. 10C, causing the cartridge door 20 to pivot in a direction indicated by arrow C allows the cartridge door 20 to be opened.

Next, operation of closing the cartridge door 20 and the image reading portion 13 will be described.

Operation of closing the cartridge door 20 first and, then, closing the image reading portion 13 will be described. This operation is reverse of the above-mentioned operation of opening the cartridge door 20. That is, when the cartridge door 20 is closed and, thereafter, the image reading portion 13 is closed, the stopper abutment portion 13x of the image reading portion 13 pushes the tray abutment portion 300b of the stopper 300 so that the stopper 300 moves. When the image reading portion 13 moves to a closed position, a state is brought about where the stopper 300 moves to a restricting position in which the stopper 300 holds a state where the cartridge door 20 is closed, and the tray abutment portion 300b and the abutment portion 22a of the stopper receiving portion 22 abut against each other. With such operations, the cartridge door 20 is held in a closed state.

Figure 11A:
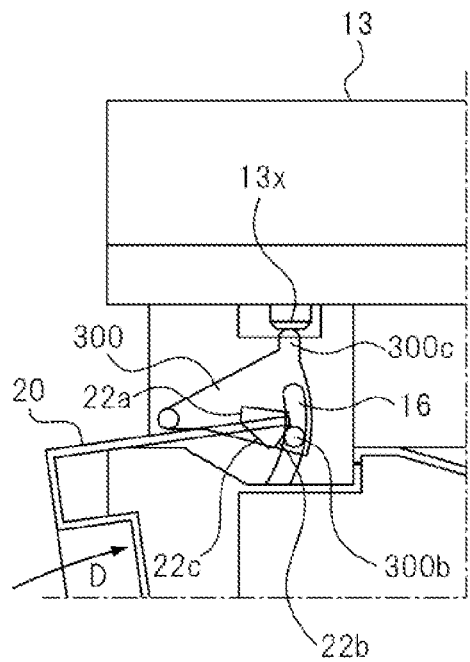
FIG. 11A is a cross-sectional view for describing operation of closing the cartridge door according to the third embodiment.

Next, operation of closing the image reading portion 13 and, thereafter, closing the cartridge door 20 will be described with reference to FIG. 11A, FIG. 11B, FIG. 11C and FIG. 11D. As shown in FIG. 11A, when the image reading portion 13 is closed first, the abutment portion 300c of the stopper 300 is pushed by the stopper abutment portion 13x of the image reading portion 13 so that the stopper 300 moves to a restricting position. Causing the cartridge door 20 to pivot in a direction indicated by arrow D in such a state allows the inclined surface 22b of the stopper receiving portion 22, which the cartridge door 20 includes, and the tray abutment portion 300b abut against each other.

Figure 11B:
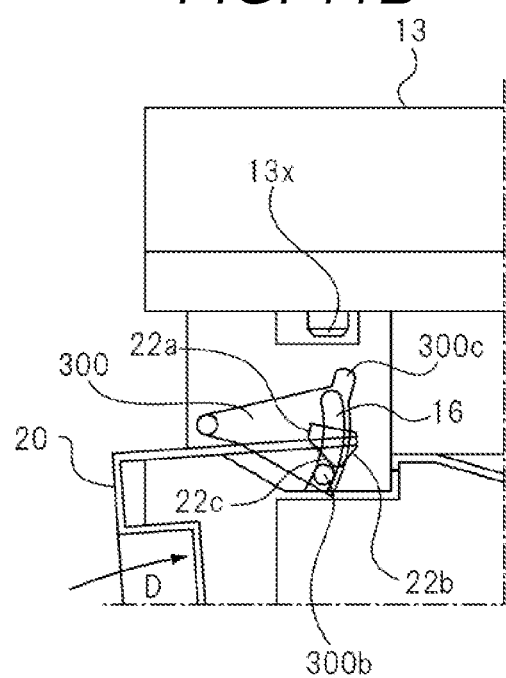
FIG. 11B is a cross-sectional view for describing the operation of closing the cartridge door according to the third embodiment.

When the cartridge door 20 is further pivoted in the direction indicated by arrow D, as shown in FIG. 11B, the tray abutment portion 300b receives a force from the inclined surface 22b to move along the inclined surface 22b. At this time of operation, the stopper abutment portion 13x of the image reading portion 13 and the abutment portion 300c of the stopper 300 temporarily separate from each other.

Figure 11C:
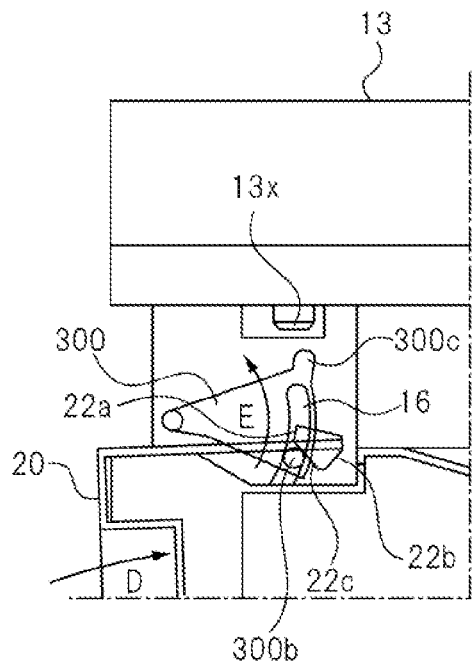
FIG. 11C is a cross-sectional view for describing the operation of closing the cartridge door according to the third embodiment.

When the cartridge door 20 is further pivoted in the direction indicated by arrow D, as shown in FIG. 11C, the tray abutment portion 300*b* moves along the inclined surface 22*c*. Further, the stopper 300 pivots in a direction indicated by arrow E due to a biasing force of a spring not shown in the drawing.

Figure 11D:
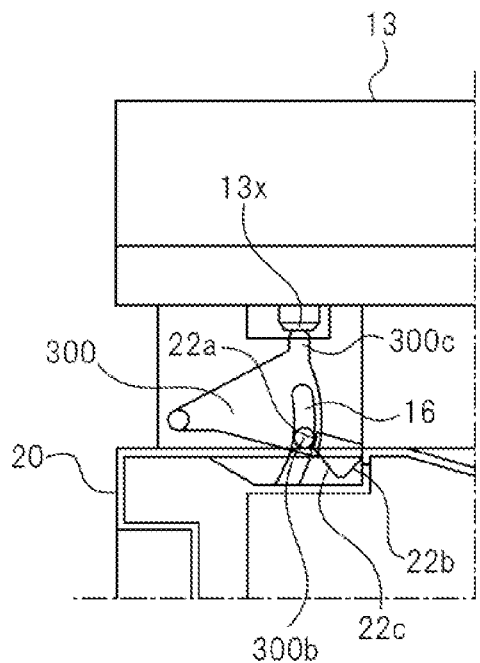
FIG. 11D is a cross-sectional view for describing the operation of closing the cartridge door according to the third embodiment.

When the cartridge door 20 is further pivoted in the direction indicated by arrow D so that the cartridge door 20 is pivoted to a closed state, as shown in FIG. 11D, the stopper 300 pivots in the direction indicated by arrow E due to a biasing force of the spring not shown in the drawing (FIG. 11C). With such pivoting, the stopper abutment portion 13*x* of the image reading portion 13 and the abutment portion 300*c* of the stopper 300 abut against each other again so that pivoting of the stopper 300 is restricted. When the stopper 300 is in a position in which pivoting of the stopper 300 is restricted, a state is brought about where the tray abutment portion 300*b* and the abutment portion 22*a* of the stopper receiving portion 22 abut against each other. Due to such abutment, pivoting of the cartridge door 20 is restricted, and the cartridge door 20 is held in a closed state.

As described above, the stopper 300 is configured to be movable in conjunction with the movement of the image reading portion 13 so that the stopper 300 with a small size can prevent a user from opening the cartridge door 20 unintentionally. Accordingly, manufacturing cost of the stopper 300 can be reduced.

Further, it is possible to prevent that a user opens the cartridge door 20 unintentionally and, as a result, operation of the image forming apparatus A stops. Accordingly, it becomes unnecessary to perform removal of a sheet staying due to stopping of the operation.

By providing the inclined surface 22*b* on the stopper receiving portion 22, the configuration is adopted where the cartridge door 20 is movable to a closed position in a state where the image reading portion 13 is closed and the stopper 300 is in a restricting position. Accordingly, either of the image reading portion 13 or the cartridge door 20 may be closed first. Therefore, a user is not required to pay attention to the order of handling and hence, usability is enhanced.

The image reading portion 13 is configured to be movable in the upward and downward direction. Accordingly, compared to a configuration where the image reading portion 13 is moved in a horizontal direction, an operation space for bringing the cartridge door 20 into an openable state can be reduced in size.

In this embodiment, a spring not shown in the drawing is used for biasing the stopper 300. However, substantially the same advantageous effects can be acquired even if the self-weight of the stopper 300 is utilized. Substantially the same advantageous effects can be also acquired even if a configuration is adopted where a guide member is provided, and the stopper 300 is caused to move along the guides of the guide member in the same manner as the stopper 200 in the second embodiment.

According to the present embodiment, a stopper with a small size can prevent a user from opening an openable and closable member unintentionally.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus which forms an image on a sheet, the image forming apparatus comprising:

an apparatus main body of the image forming apparatus;

an openable and closable member being supported on the apparatus main body in an openable and closable manner with respect to the apparatus main body;

an image reading portion configured to read an image of an original, the image reading portion being supported on the apparatus main body and being movable to a first open position and to a first closed position with respect to the apparatus main body, the first closed position having a positional relationship with respect to the apparatus main body different from the first open position; and a stopper member provided in the apparatus main body and configured to move in conjunction with a movement of the image reading portion, wherein, when the image reading portion is in the first closed position, the stopper member is in a restricting position in which the stopper member restricts the openable and closable member from being moved from a second closed position to a second open position, wherein, when the image reading portion is in the first open position, the image reading portion is separated from the stopper member, and wherein, when the image reading portion is in the first open position so that the image reading portion is separated from the stopper member, the stopper member is in an allowing position in which the stopper member allows the openable and closable member to be moved from the second closed position to the second open position.

2. The image forming apparatus according to claim 1, wherein when the image reading portion is moved from the first open position to the first closed position, the stopper member is pushed by the image reading portion so as to be moved to the restricting position.

3. The image forming apparatus according to claim 1, wherein the stopper member is provided in the apparatus main body in a pivotable manner, and pivots in conjunction with a movement of the image reading portion.

4. The image forming apparatus according to claim 1, wherein when the openable and closable member is moved toward the second closed position from a state in which the stopper member is positioned in the restricting position and the openable and closable member is in the second open position, the stopper member is moved from the restricting position, and when the openable and closable member arrives at the second closed position, the stopper member is returned to the restricting position.

5. The image forming apparatus according to claim 1, wherein the apparatus main body includes a biasing means for biasing the stopper member, and wherein, when the image reading portion is moved from the first closed position to the first open position, the stopper member is moved from the restricting position to the allowing position by a biasing force of the biasing means.

6. The image forming apparatus according to claim 1, wherein when the image reading portion is moved from the first closed position to the first open position, the stopper member is moved from the restricting position to the allowing position by a self-weight of the stopper member.

7. The image forming apparatus according to claim 1, wherein the openable and closable member comprises a discharge tray configured to stack a sheet discharged from an inside of the apparatus main body.

8. The image forming apparatus according to claim 7, wherein the apparatus main body includes an interlock switch, and
> wherein a movable arm portion of the interlock switch is disposed at a position closer to the stopper member than a center of a sheet stacking area of the discharge tray in a direction orthogonal to a sheet discharging direction.

9. The image forming apparatus according to claim 8, wherein the movable arm portion is disposed at a position closer to the stopper member than the sheet stacking area.

10. The image forming apparatus according to claim 8, wherein a sliding-type extension tray which extends the sheet stacking area in the sheet discharging direction is provided in the discharge tray.

11. The image forming apparatus according to claim 1, wherein, when the image reading portion is in the first open position, the stopper member is away from the openable and closable member.

12. The image forming apparatus according to claim 11, wherein the openable and closable member comprises an engaged portion,
> wherein, when the image reading portion is moved to the first closed position, the stopper member is moved to the restricting position in which the stopper member restricts the openable and closable member from being moved from the second closed position to the second open position by engaging the stopper member with the engaged portion, and
>
> wherein, when the image reading portion is moved to the first open position, the stopper member is moved to the allowing position in which the stopper member allows the openable and closable member to be moved from the second closed position to the second open position without engaging the stopper member with the engaged portion.

13. The image forming apparatus according to claim 1, wherein the image reading portion includes an abutment portion,
> wherein when the image reading portion is in the first closed position, the abutment portion abuts against the stopper member such that the stopper member is located in the restricting position, and
>
> wherein when the image reading portion is moved from the first closed position to the first open position, the abutment portion separates from the stopper member such that the stopper member is allowed to move from the restricting position to the allowing position.

14. The image forming apparatus according to claim 1, wherein when the openable and closable member is in the second open position, a cartridge disposed in the apparatus main body can be accessed.

15. The image forming apparatus according to claim 1, wherein when the image reading portion is in the first open position and the openable and closable member is in the second closed position, the stopper member is in the allowing position.

16. The image forming apparatus according to claim 1, wherein the openable and closable member includes a first portion and the stopper member includes a second portion,
> wherein in a state where the image reading portion is in the first closed position and the openable and closable member is in the second closed position, the second portion is configured to abut the first portion such that the stopper member restricts the openable and closable member from being moved from the second closed position to the second open position, and
>
> wherein in a state where the image reading portion is in the first open position, the second portion is configured to separate from the first portion such that the stopper member allows the openable and closable member to be moved from the second closed position to the second open position.

* * * * *